Figure 1:
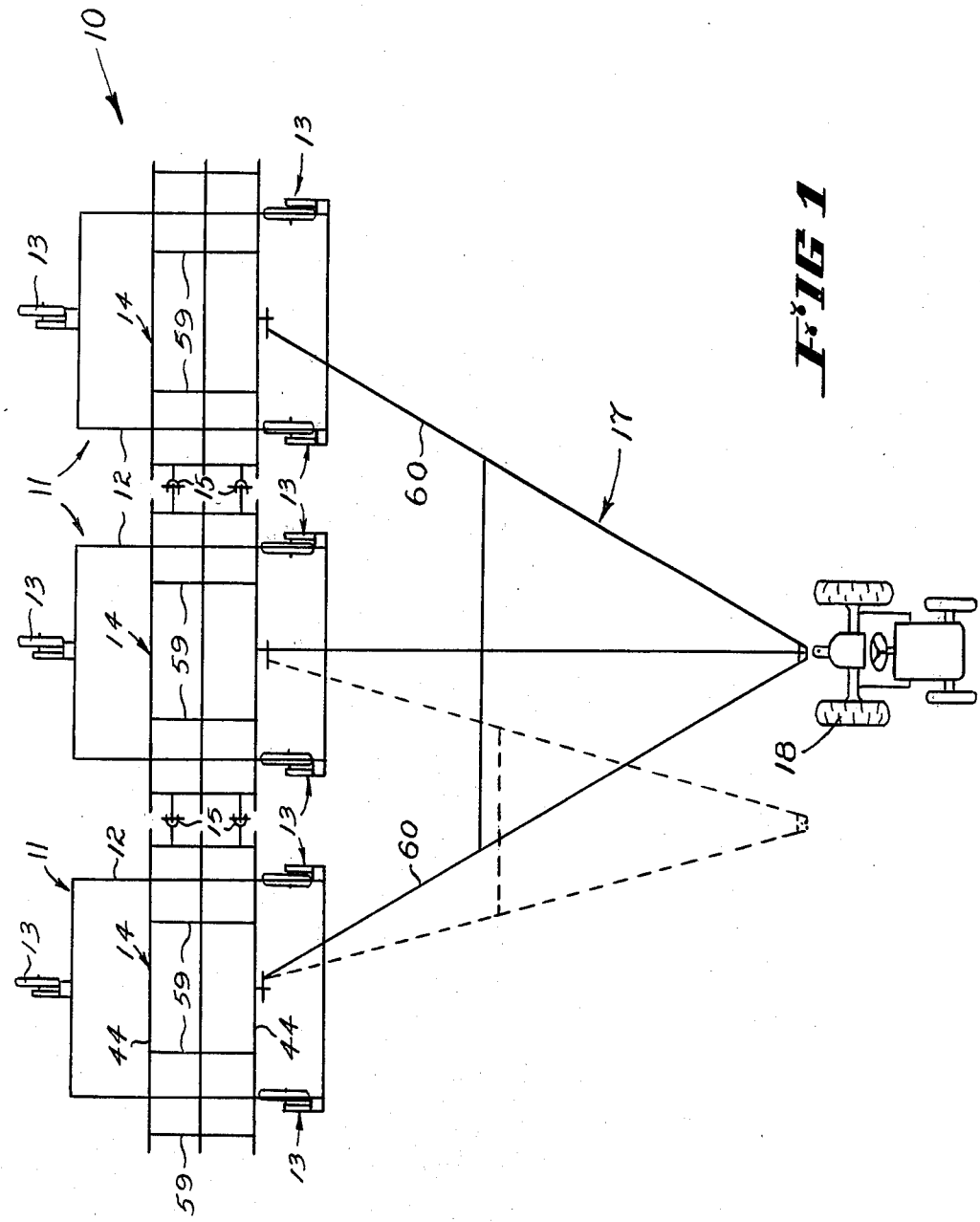

United States Patent [19]

Ferber et al.

[11] 4,396,069
[45] Aug. 2, 1983

[54] AGRICULTURAL IMPLEMENT CARRIAGE SYSTEM

[75] Inventors: Malcolm F. Ferber, Loxton; John J. McCabe, Mindarie, both of Australia

[73] Assignee: M. F. Ferber Nominees Pty. Ltd., Australia

[21] Appl. No.: 158,852

[22] Filed: Jun. 12, 1980

[3 ] Foreign Application Priority Data

Jun. 19, 1979 [AU] Australia .................. PD9254

[51] Int. Cl.³ ............................... A01B 63/32
[52] U.S. Cl. ............................ 172/310; 172/253; 172/466; 172/484
[58] Field of Search ............... 172/248, 253, 310, 311, 172/313, 483, 484, 619, 620, 625, 626, 627, 629, 677, 679, 307, 481, 502, 512, 466; 280/411 R, 411 A, 411 B, 415 R, 415 A, 494

[56] References Cited

U.S. PATENT DOCUMENTS

| | | | |
|---|---|---|---|
| 693,851 | 2/1902 | Francoeur | 172/483 |
| 816,449 | 3/1906 | Fleming | 172/483 X |
| 1,188,827 | 6/1916 | Poulter | 172/625 X |
| 1,645,483 | 10/1927 | Haley | 172/483 X |
| 2,417,597 | 3/1947 | Hill | 172/512 |
| 3,256,942 | 6/1966 | Van Sickle et al. | 172/310 |
| 3,389,754 | 6/1968 | Allison | 172/484 X |
| 4,083,411 | 4/1978 | van der Lely | 172/248 X |
| 4,186,805 | 2/1980 | Repski | 172/484 X |

FOREIGN PATENT DOCUMENTS

| | | | |
|---|---|---|---|
| 493777 | 6/1950 | Belgium | 172/466 |
| 727392 | 2/1966 | Canada | 172/484 |
| 832713 | 2/1952 | Fed. Rep. of Germany | 280/494 |

*Primary Examiner*—Richard T. Stouffer
*Attorney, Agent, or Firm*—Townsend and Townsend

[57] ABSTRACT

A multi-section agricultural implement comprising a plurality of side-by-side separate sections each comprising a main carriage frame independently supported by ground engaging wheels and an implement supporting sub-frame supported by the main frame, an adjacent sub-frame being connected solely through universal joint connection means, and a towing frame connected to some of the sub-frames and being arranged to be hitched to a towing vehicle.

10 Claims, 7 Drawing Figures

AGRICULTURAL IMPLEMENT CARRIAGE SYSTEM

This invention relates to an improved agricultural implement, and in particular to a multi-section implement which can be used for the carriage of any one of a range of agricultural ground working tools to perform, for example, cultivating, harrowing, scarifying, ploughing and seeding operations.

At the present time there is little or no standardisation of agricultural implements and the usual procedure adopted by a farmer is to select one from a number of different implements, hitch it to a tractor and use the implement. Each implement comprises basically a set of ground engaging tools, often mounted on an implement supporting sub-frame which is fixedly connected to a carriage frame which is usually provided with supporting wheels. The pulling force of the tractor is applied through the main carriage frame to the sub-frame (if used) and then to the ground engaging tools. This procedure works satisfactorily provided the power required to use each of these tools does not exceed the capacity of the tractor, but the system is not versatile and for example if an operator acquires a larger tractor, much of his cultivating and seeding equipment becomes obsolete and needs to be replaced by larger machinery.

One object of this invention is to provide a system whereby the effective size of an agricultural implement can be varied by subtracting or adding sections to which may be selectively attached any one set from a number of different sets of ground engaging tools.

With the advent of wide multi-section implements, a significant problem has arisen due mainly to the uneven terrain which the wide implement is likely to encounter during farming work. While relatively small implements are satisfactory in working over uneven terrain, much difficulty has been encountered with wide multi-section implements in maintaining an even depth of penetration of the set of ground working tools for each section. Due to the variations in the contour of the ground, one section, at any given time, may be moving over ground at a much different elevation from that traversed by another section, or even from that traversed by the tractor. With prior art implements, it has generally been found that, over uneven terrain, the ground-working tools of different sections operate at varying depths, thus causing uneven working of the soil as well as undesirable strain on various parts of the implement, particularly at the hinged joints between the sections.

Although various efforts have been made to overcome the above problems, the Applicants are unaware of a system which solves the problems satisfactorily, namely one which will allow all the sets of ground-working tools to operate at a substantially uniform depth, regardless of the unevenness of the terrain, and one which will allow each of the sections to follow the contour of the ground over which it traverses, independent of the other sections.

It is a further object of the present invention therefore to provide a multi-section implement which obviates the aforementioned problems, and one which is of relatively simple construction and of relatively low cost (in comparison with the cost of having to purchase a number of different implements which carry out individual operations).

According to this invention therefore, a multi-section agricultural implement comprises (a) a plurality of spaced transversely aligned sections each comprising a main frame independently supported by ground-engaging wheels, a ground-working tool supporting sub-frame, sub-frame support means on the main frame attaching said sub-frame to the main frame, the support means including lifting means operable to raise and lower the sub-frame relative to the ground, (b) universal joint connection means detachably interconnecting each sub-frame with an adjacent said sub-frame allowing relative universal articulating movement therebetween, and (c) a forwardly extending towing frame comprising at least two towing frame members detachably connected at their rear ends to respective said sub-frames, means interconnecting the forward ends of said towing frame members, and hitch means for hitching to a towing vehicle such as a tractor.

With this arrangement, each main carriage frame together with its implement supporting sub-frame which supports a set of ground-engaging tools, comprises an independent section which is connected to similar adjacent sections solely through the universal joint connection means between adjacent implement supporting sub-frames to thereby form a composite or multi-section agricultural implement the size of which is dependant upon the number of individual sections. Since a large part of the cost of an agricultural implement is its main carriage frame, the use of standardised frames obviates the need for purchase of a complete new implement and thereby greatly reduces the inventory requirement of a farmer, supplier or manufacturer.

Furthermore, with the present invention, the carriage frames and their respective implement supporting sub-frames can be moved as a "train", and hence can be moved along a narrow carriageway, for example along a road or through a gate. In order to do this, the sub-frames are lifted to their raised position by the lifting means and the main carriage frame support wheels are rotated through an angle of 90° and locked. The tractor vehicle is then positioned alongside of or at one end of the sections, with its wheels substantially parallel with the wheels of the implement, whereupon the implement can be moved "end on" by the tractor.

Heretofore, since the load is normally applied from the ground engaging tool to the tractor hitch through the main carriage frame of an agricultural implement, the main frames of existing implements are heavily constructed and of course this results in additional cost and unnecessary weight for towing purposes. With the present invention, by having the towing frame connected directly to at least two implement supporting sub-frames of respective independent carriage frames, the carriage frames themselves can be of relatively light construction. This arrangement avoids strain being applied to the main carriage frame members, and the direct towing strain on the implements themselves or their sub-frames provides additional advantages in some instances where cultivation forces are more directly transmitted to the hitch of a tractor thereby reducing moment arm lengths and consequently reducing torque loading on the implements.

Figure 2:
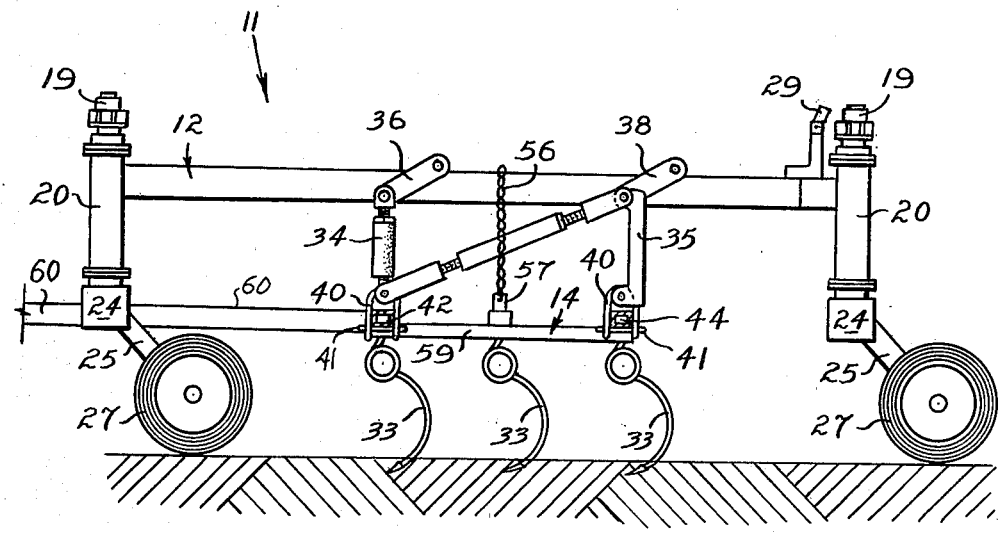
Figure 3:
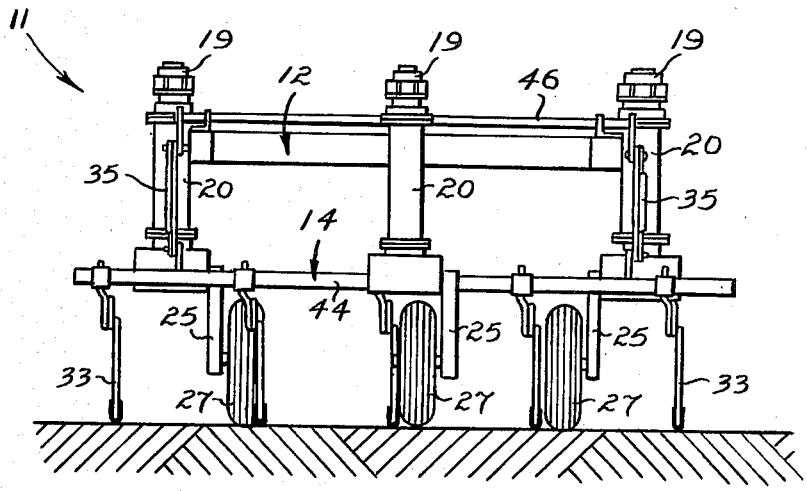
Figure 4:
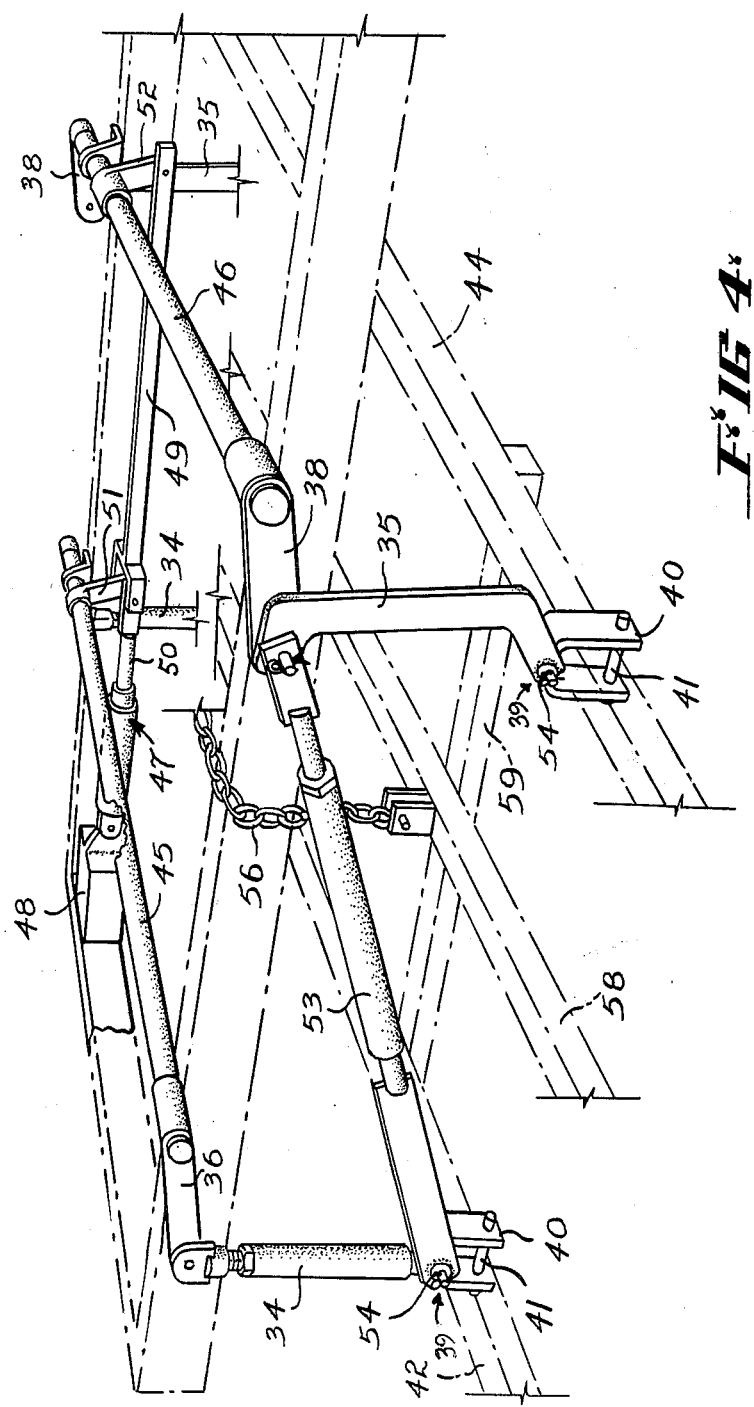
Figure 5:
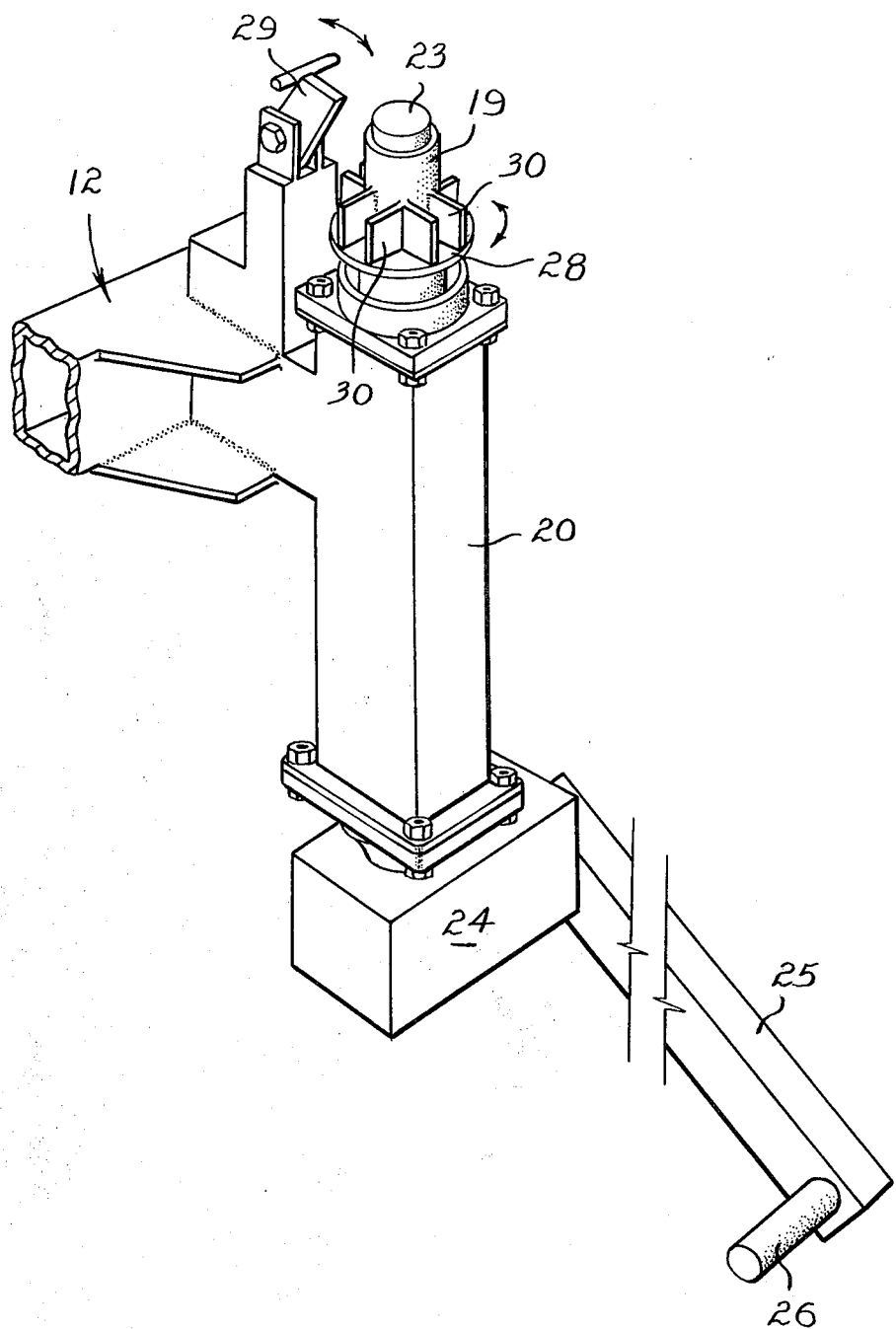
Figure 6:
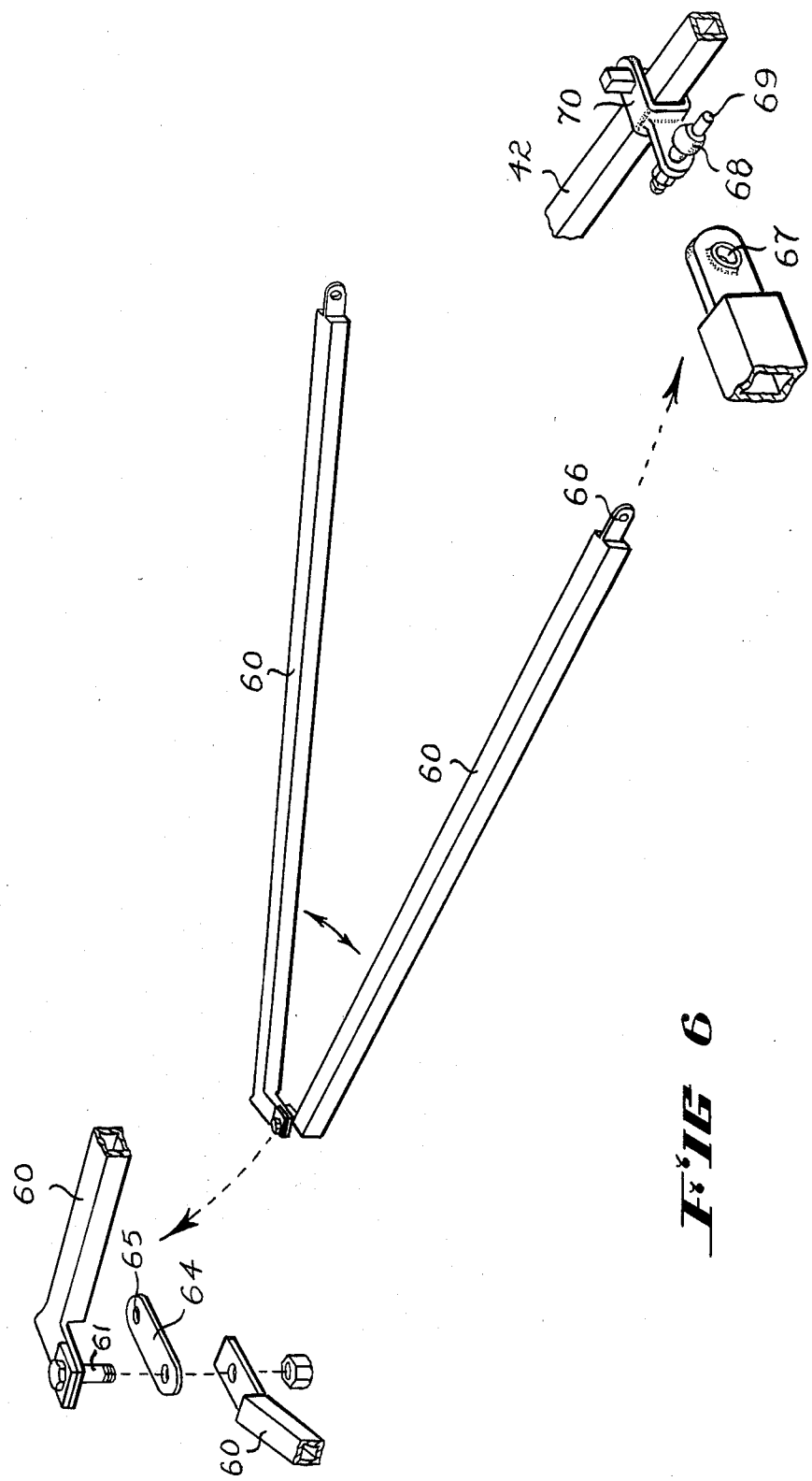
Figure 7:
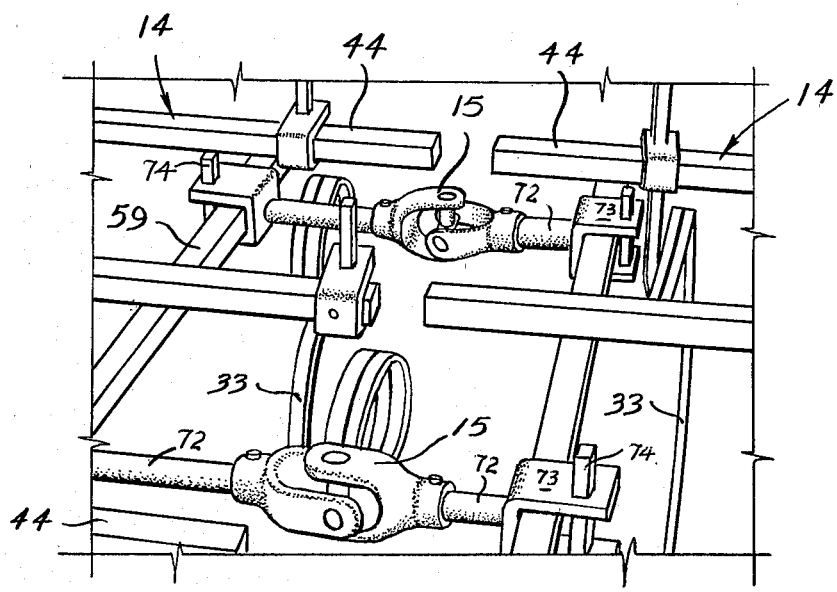

In order to further explain the Applicant's invention, an embodiment is described hereunder in some further detail with reference to and illustrated in the accompanying drawings in which:

FIG. 1 is a schematic plan view of the Applicant's system to form a multi-section implement (the dotted lines showing the arrangement of the towing frame when using two sections), FIG. 2 is a side elevation of one of the implement sections of this invention, FIG. 3 is a rear end elevation of the section shown in FIG. 2, FIG. 4 is a perspective view of part of the section of FIG. 2 showing the means by which the sub-frame is supported for raising and lowering by the main frame, FIG. 5 is a perspective view of one of the castor wheel assemblies supporting the main carriage frame, FIG. 6 is a perspective view (partly exploded) of one form of towing frame, showing the connection to one of the sub-frame chassis members, and FIG. 7 is a perspective view of the universal joint connections between a pair of adjacent sub-frames.

In this embodiment, a multi-section agricultural implement 10, comprises a series of spaced transversely aligned independent sections 11, each section 11 having a main carriage frame 12 independently supported by castor wheel assemblies 13 and an implement supporting sub-frame 14 adjacent ones of which are interconnected by universal joints 15, the sub-frames 11 being joined to a towing frame 17 which is arranged to be hitched to a towing vehicle, such as a tractor 18.

Each of the main frames 12, in this embodiment, are identical, and are of rectangular shape, each being provided with three tubular bearings 19, one at each front corner and one at the rear, each having a vertical axis. The bearings 19 are contained in housings 20 secured to respective frames 12 and each journals a vertical king pin 23, the lower end of which engages in a swivel block 24 which carries a downwardly sloping trailing arm 25 which in turn supports, on axle 26, a ground-engaging wheel 27 for rotation as a castor wheel. The upper end of each king pin 23 is provided with a disc 28 and near the periphery of the disc 28 but located on the main frame, there is provided a pivoted latch member 29 which is selectively engageable in any one of a plurality of circumferentially spaced recesses 30 formed on the upper surface of the disc 28. In this embodiment there are four recesses so that each castor wheel 13 can be fixed in any one of four positions, but by withdrawing the latch member 29 away from the disc 28 on the housing, the wheel is able to freely castor. This provides an almost universal adjustment means for the wheels.

Each of the main carriage frames 12 has its own implement supporting sub-frame 14 which is provided with a set of ground-engaging tools 33, the sub-frame 14 being attached to the main frame 12 by a parallelogram linkage support which comprises two pairs of transversely aligned lifting arms 34, 35 pivotally attached at their upper ends to corresponding links 36, 38 respectively and at their lower ends by means of ball joints 39, to inverted U-shaped brackets 40 detachably connected, by means of a removable pin 41, to the sub-frame chassis members 42, 44. The links 36, 38 are secured at their trailing ends to transverse axles 45, 46 respectively at the ends thereof, the axles 45, 46 having their ends projecting a short distance from the sides of the main frame 12. The ball joints 39 are of known design and comprise a ball carried on a transverse shaft, the ball being journalled for rotation within a socket on the end of the arms 34, 35.

A lifting ram 47 is provided on each main frame 12, its cylinder end being pivoted to a mounting block 48, whilst its piston rod 50 is pivotally coupled to one end of a swinging arm 51, the other end of the arm 51 being attached to the axle 45, the piston rod 50 also being pivotally connected through a piston rod extension 49, to a further swinging arm 52 which is itself attached to the transverse axle 46. The arrangement is such that, upon actuation of the ram, the piston rod is extended and this effects simultaneous rotation of the arms 51, 52 and the corresponding axles 45, 46, in turn rotating the links 36, 38 to thereby vertically lower the lifting arms 34, 35 together with the sub-frame 14. Retraction of the piston rod reverses the movement and vertically raises the sub-frame 14 clear of the ground. For sake of clarity, the hydraulic lines have not been shown, but it will be appreciated that the rams on the separate sections 11 are operated simultaneously.

The arms 34 are threadably adjustable to vary the length thereof and in turn the degree of tilt of the sub-frames 14 relative to the ground. There is also provided an adjustment link 53 which is pivotally connected at one end to a transverse bolt 54 forming part of the ball joint 39 at the forward end of the implement supporting sub-frame 14 and at its other end to the pivot connection between the arm 35 and link 38, threaded adjustment of the link 53 being effective to maintain approximate parallelism between the pairs of arms 34, 35. Each frame 12 is also provided with depth limiting means which both controls and limits the depth of penetration of the ground-working tools 33 into the ground during use, this being in the form of a chain 56 which straddles the main frame 12 with its depending ends attached to upstanding lugs 57 on central sub-frame chassis member 58, one near each end thereof. The length of the chain can be varied to in turn vary the depth of penetration of the tools 33 on the sub-frame 14.

It will of course be realized that the connection between the implement supporting sub-frames 14 and their associated main carriage frames 12 may take various forms and in another embodiment (not illustrated), the connection comprises a pair of hydraulic rams, one on each side of the main frame, each coupled to a lifting arm intermediate its ends thereof, the lifting arm being pivotally attached at its lower end to a detachable bracket at the rear of the sub-frame and at its upper end to a transverse pivot member carried on the main frame. A pair of further support links, each pivoted at its lower end to the front of the sub-frame and at its upper end to a pivot on the main frame, assist in supporting the sub-frame which, upon actuation of the rams, can be made to pivot in an upwards or downwards direction. It will also be realized that the means to limit the depth of penetration of the tools 33 into the ground may also take various other forms.

Each implement supporting sub-frame 14 comprises three relatively long transverse chassis members 42, 44, 58 interconnected by relatively short longitudinal brace members 59, the longitudinal members having detachable brackets or lugs projecting at points where they can be readily connected (or disconnected) to the lifting arms 34, 35 depending from the sides of the main carriage frame 12. The chassis members project to each side of the main frame to enable the connection between adjacent sub-frames to be readily accessible, and to allow sufficient clearance between adjacent main frames so that there is no likelihood of interference during use over uneven terrain.

The towing frame 17 in this embodiment, comprises a pair of converging drawbar members 60 connected at their forward ends to a common vertical pivot pin 61 to which is also attached a forwardly projecting tongue member 64 formed to have an aperture 65 for hitching the towing frame 17 to the hitch of a tractor 18. The trailing or rear ends of the drawbar members 60 have projecting lugs 66 formed with sockets 67 which house balls 68 each carried on a traverse shaft 69 supported by a bracket 70 which is detachably connected to the front chassis member 42 of the sub-frame 14. This permits limited universal articulation between the towing frame and the sub-frame but of course it will be appreciated that any form of ball or knuckle joint or universal connection can be used at these connection points.

With this arrangement, when the sub-frames 14 are in their in-use position with the ground-engaging tools engaging the ground and the implement moving in a longitudinal direction, the towing forces are directly transmitted to the implement supporting sub-frames 14, and furthermore the cultivation forces (as a result of the cultivation tools engaging the ground) are directly transmitted to the hitch of the tractor and this reduces moment arm lengths and consequently reduces torque loading on the implement sub-frames themselves.

Each implement supporting sub-frame 14 is connected to an adjacent sub-frame 14 by means of two universal joints 15 which in this embodiment are of the knuckle joint type, each joint 15 comprising co-operable halves carried on transverse shafts 72 which are detachably connected to outermost brace members 59 of the sub-frames 14 by means of U-shaped brackets 73 and removable wedge pins 74 passing through the flanges of the brackets 73. Each of the connections 15 may be removed to thereby disconnect adjacent implement supporting sub-frames 14 by simply removing a pair of the removable pins 74. The use of the universal ball joint connections 15 enables adjacent sub-frames 14 to move relative to one another in both the horizontal and vertical planes.

When it is desired to use the implement, the three main frame supporting wheels 13 can be arranged to any requirement selected by the operator, typically the back wheel of each carriage frame 12 being locked in the fore and aft direction and the front wheels being allowed to castor. The disposition of the wheels may be reversed to that shown in the drawings, namely, one at the front of the frame, intermediate the sides thereof, and two at the rear corners of the frame.

It is, of course, possible to employ four castor wheels, one at each corner of the rectangular main frame. The towing coupling in all cases is from the tractor hitch to the sub-frames by means of the A-frame drawbar 17.

In some instances it may be desired to use the carriage frames for supporting a combine seeding box and this is achieved by providing attachment means on the top surfaces of the carriage frames. Drive for seeding is supplied by a removable sprocket attached to a fixed pin on one of the pivoted wheels of the carriage frame. Similar attachment means for the attachment of spray equipment can also be applied.

A brief consideration of the above embodiment will indicate that the invention is of simple construction but nevertheless provides a system whereby the effective size of an agricultural implement can be readily varied by subtracting or adding implement supporting sub-frame sections, the adjacent ones of which are interconnected by universal joints. By avoiding transmittal of both towing and cultivation forces through the main carriage frames, such frames can be made of relatively light construction and this affords a significant cost saving. Still further, the applicant's invention provides a multi-section implement each section of which is able to follow the contour of the land over which it traverses independently of other sections which may be at different elevations.

We claim:

1. A multi-section agricultural implement comprising:
   (a) a plurality of spaced transversely aligned sections each comprising a main frame independently supported by ground-engaging wheels, a ground-working tool supporting sub-frame, linkage support means on the main frame attaching said sub-frame to the main frame, the support means including lifting means operable to raise and lower the sub-frame relative to the ground, each said sub-frame comprising a series of transversely extending longitudinally spaced chassis members, the length of each which is greater than the width of its associated main frame, the chassis members being arranged with their ends projecting to each side of the main frame, and longitudinally extending transversely spaced brace members interconnecting said chassis members;
   (b) chain attachment means between each said main frame and its associated said sub-frame for suspending the sub-frame from its said main frame and for limiting the depth of penetration of the ground-working tools into the ground, said chain attachment means comprising a length of chain straddling its associated main frame and having chain portions respectively depending from the sides of a said main frame, said depending chain portions being attached to the associated sub-frame centrally thereof;
   (c) universal joint connection means detachably interconnecting each sub-frame with an adjacent said sub-frame allowing relative universal articulating movement therebetween; and
   (d) a forwardly extending towing frame comprising at least two towing frame members detachably connected at their rear ends by pivot means to the front of respective said sub-frames, each said pivot means being located in approximately the same plane as the plane of its corresponding sub-frame, means interconnecting the forward ends of said towing frame members, and hitch means for hitching to a towing vehicle such as a tractor.

2. An agricultural implement according to claim 1 wherein each said main frame is supported by at least three said ground-engaging wheels of the castor type which includes a rotatable stem at the lower end of which is a wheel carrying trailing arm, there being co-operable latch and latch-engaging means on the stem and the corresponding main frame to selectively lock the stem in any one of a plurality of rotational positions.

3. An agricultural implement according to claim 2 wherein the main frames are of rectangular shape, each being supported by three said castor wheels, two of the three said wheels being positioned at the front of the main frame one at each corner thereof, the other said wheel being positioned at the rear of the main frame intermediate the sides thereof.

4. An agricultural implement according to either claim 1 or claim 3 wherein said support means comprises a parallelogram linkage which includes two pairs of transversely aligned lifting arms depending from the main frame and attached by respective pivot means to the associated sub-frame, there being one said pair of arms on each side of the main frame, and wherein said lifting means comprises at least one hydraulic ram operatively coupled to at least one of the said pairs of arms.

5. An agricultural implement according to claim 4 wherein each said pair of aligned arms is interconnected by a transverse axle which is coupled to the piston rod of said ram so as to effect, upon actuation of the ram, rotation thereof and in turn upward lifting movement of its corresponding said arms.

6. An agricultural implement according to claim 4 wherein the support means comprises a tilt adjustment link operable to adjust the tilt of the sub-frame.

7. An agricultural implement according to claim 1 wherein said towing frame members converge in a forwards direction, each said towing frame member being connected to its corresponding sub-frame at the front side thereof, the connection comprising pivot means arranged to permit at least some limited universal articulation of the sub-frame relative to its associated towing frame member.

8. An agricultural implement according to claim 7 wherein said means interconnecting the forward ends of said towing frame members comprises a vertical pivot pin or bolt, said hitch means comprising a tongue member also pivoted to said vertical pivot pin or bolt.

9. An agricultural implement according to claim 1 wherein the sections are of identical shape and size.

10. A multi-section agricultural implement comprising:
(a) a plurality of spaced transversely aligned sections each comprising a main frame independently supported by ground-engaging wheels, a ground-working tool supporting sub-frame, linkage support means on the main frame attaching said sub-frame to the main frame, the support means including lifting means operable to raise and lower the sub-frame relative to the ground, each said sub-frame comprising a series of transversely extending longitudinally spaced chassis members, the length of each which is greater than the width of its associated main frame, the chassis members being arranged with their ends projecting to each side of the main frame, and longitudinally extending transversely spaced brace members interconnecting said chassis members;
(b) a length of chain straddling each said main frame and having portions depending from the sides of its associated main frame attached to the associated sub-frame centrally thereof to limit to a chosen maximum distance the distance the sub-frame is lowered below the main frame by the chain thereby limiting the depth of penetration of the ground-working tools into the ground;
(c) universal joint connection means detachably interconnecting each sub-frame with an adjacent said sub-frame allowing relative universal articulating movement therebetween; and
(d) a forwardly extending towing frame comprising at least two towing frame members detachably connected at their rear ends by pivot means to the front of respective said sub-frames, each said pivot means being located in approximately the same plane as the plane of its corresponding sub-frame, means interconnecting the forward ends of said towing frame members, and hitch means for hitching to a towing vehicle such as a tractor.

* * * * *